Figure 1:
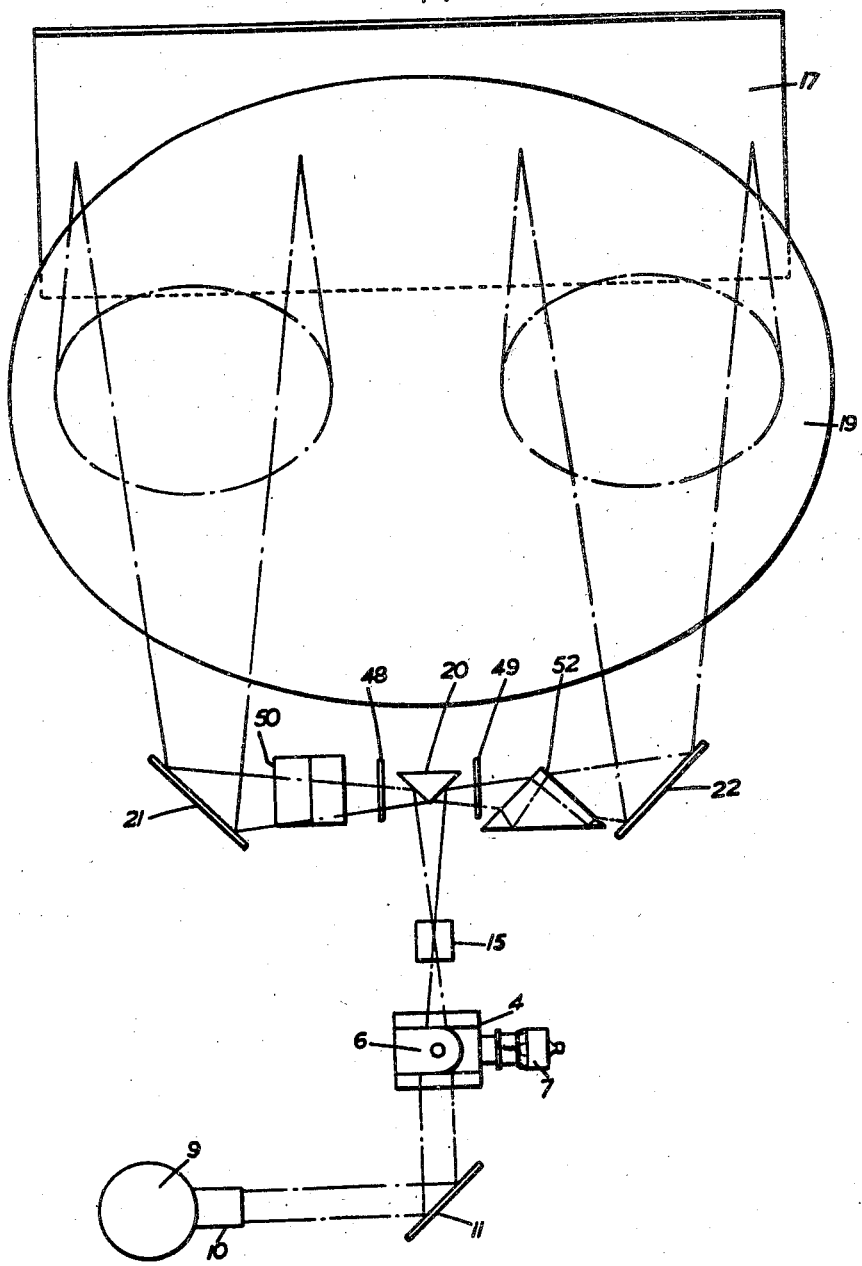

Dec. 28, 1948. K. MITCHELL 2,457,170
OPTICAL PROJECTION APPARATUS
Filed June 8, 1944 2 Sheets-Sheet 1

Inventor
Kenneth Mitchell
By
Attorney

Dec. 28, 1948. K. MITCHELL 2,457,170
OPTICAL PROJECTION APPARATUS
Filed June 8, 1944 2 Sheets-Sheet 2

Inventor
Kenneth Mitchell
By
Attorney

Patented Dec. 28, 1948

2,457,170

UNITED STATES PATENT OFFICE 2,457,170

OPTICAL PROJECTION APPARATUS

Kenneth Mitchell, London, England, assignor, by mesne assignments, to International Standard Electric Corporation, New York, N. Y., a corporation of Delaware Application June 8, 1944, Serial No. 539,285
In Great Britain June 11, 1943

2 Claims. (Cl. 88—24)

This invention relates to optical projection apparatus of the kind in which an enlarged silhouette image of an object is projected upon a screen for the purpose of inspection of the accuracy of manufacture.

In U. S. Patent No. 2,365,613 dated December 19, 1944 there is described and claimed optical projection apparatus comprising means for producing on a screen two silhouette images of an object one inverted with respect to the other and means for producing relative movements of the two images. There was also described and claimed optical projection apparatus comprising means for producing an image of an object on a screen, means for producing on the said screen an inverted image of a master for comparison with the object and means for producing relative movement of the two images whereby the object may be compared as to form with the master.

It is the object of the present invention to provide apparatus for carrying out the invention of the above mentioned specification in a simpler and more convenient manner.

The apparatus described in the said specification comprised a lens system for forming an image of an object, a prism having external mirrored surfaces and located in the beam from said lens system so as to divide said beam into two beams, an internally reflecting prism in one of said beams, mirrors directing the respective beams on to the screen and micrometer screw means for moving the mirrors to cause said images on the screen to approach or recede from one another.

Each of the external mirrored surfaces of the above mentioned prism forming the two beams was parallel to the mirror directing the beam therefrom on to the screen, and the axes of the original beam, the two beams formed by the externally reflecting prism and the two beams reflected from the mirrors were all in the same plane. The internally reflecting prism inverted one image with respect to the other in a vertical direction on the screen so that vertical movement of the object caused vertical movement of the two images in opposite directions on the screen, and the two images could be brought towards one another in this direction merely by movement of the object. The two images were not, however, inverted with respect to one another horizontally on the screen and thus movement of the mirrors was necessary to move the images with respect to one another horizontally on the screen.

According to the present invention we provide optical projection apparatus comprising means for producing on a screen two silhouette images of an object, or a silhouette image of an object and a silhouette image of a master inverted with respect to one another in two directions at right angles to one another, and means for moving the object or the object and the master together in either of two directions at right angles whereby relative movement of the two images in corresponding directions on the screen is produced.

Figure 2:
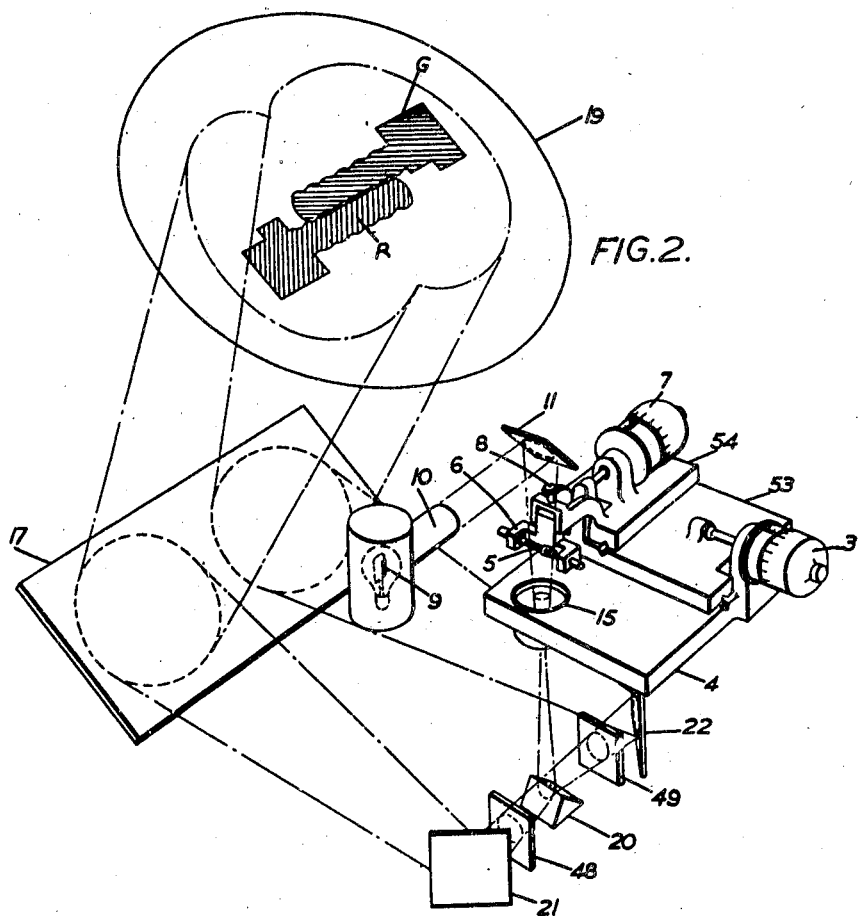

The nature of the invention will be better understood from the following description taken in conjunction with the accompanying drawings of which Figures 1 and 2 show two different embodiments of the invention.

Referring to the drawings, Fig. 1 is a diagrammatic view of one form of apparatus according to the present invention.

An object 5 to be examined is supported in the same manner as in the above mentioned specification in a work-holder 6 mounted for horizontal movement in a slide 4 by means of a micrometer 7 and for vertical movement by means not shown, but similar to the means provided in the above mentioned application.

A lamp 9 and condenser 10 produce a collimated beam of light reflected by mirror 11 towards the object. A lens 15 forms a silhouette image of the object. The beam from the lens 15 is divided by means of externally reflecting surfaces on a prism 20. The two beams thus formed pass through different colour filters 48, 49 and are reflected by fixed mirrors 21, 22 on to a rear mirror 17 by means of which the beams are reflected forward on to the rear of an inclined partially opaque glass screen 19. One of the beams passes through an internally reflecting prism 50 which reverses the beam in a direction at right angles to the plane of the paper and the other of the beams passes through an internally reflecting prism 52 which reverses the beam in the plane of the paper. Though the mirrors 21 and 22 are shown in the drawing as inclined to one another at 90° the angle between them would in practice be less than 90° in order to bring the two resulting images closer together on the screen.

Since the beams are reversed with respect to one another in two directions mutually at right angles the two images on the screen 19 are reversed with respect to one another both vertically and horizontally and movement of the work holder 6 either vertically or horizontally in a plane perpendicular to the collimated beam will cause the two images on the screen to move with respect to one another in the corresponding direction.

The arrangement shown in Fig. 2 is an alternative and preferred means of achieving the same result. In this form, the mirror 11 reflects a beam from the lamp 9 and condenser 10 downwards to form a silhouette of the object 5. The beam from the lens 15 is divided by the external reflecting surfaces of a prism 20 placed with its edge horizontal. The prism 20 thus produces two horizontal beams which, passing through colour filters 48 and 49, are reflected again horizontally by fixed mirrors 21 and 22 on to the rear mirror whence they are reflected on to the partially opaque screen. In this manner, the two enlarged images R and G formed on the screen 19 are reversed with respect to one another in two directions at right angles on the screen.

The object 5 is mounted between centres in a cradle 6 which in turn is mounted on a platform 54 slidable on steel balls on a platform 53. Platform 53 is in turn slidable on steel balls on fixed platform 4 in which the lens 15 is mounted. Platform 53 is lightly spring loaded against a micrometer head 3, and platform 54 is lightly spring loaded against a micrometer head 7. The object 5 may thus be traversed in two directions at right angles to one another in a plane at right angles to the axis of the beam reflected by mirror 11 by measured amounts and thus the two images R and G brought into desired relation with one another.

In both the above forms of apparatus the mirror 11 is preferably mounted in the manner described in the above mentioned application so as to be movable in a slot in the form of a circular arc having the nodal point of the lens 15 as centre of curvature.

In both forms, also, provision may be made for the use of the instrument as an episcope whereby the depths of depressions in the surface of an object or the heights of bosses thereon may be measured in the direction of the projection axis. In Fig. 2 micrometer focussing screw 8 is shown for measuring purposes and in Fig. 1 a similar micrometer focussing screw is provided. In the form of apparatus shown in Fig. 1 the externally reflecting prism 20 is preferably removably mounted so that when using the instrument as an episcope only one image appears on the screen. In the apparatus shown in Fig. 2, a shutter may be provided to be placed in front of one of the two fixed mirrors 21 or 22 in order that only one image is seen on the screen. If a shutter is placed in front of mirror 21, the color filter 49 is preferably removed in order to make use of white light when forming the episcope image.

In either of the two forms of apparatus above described, provision is made for mounting in the cradle 6 an object and a master with which the object is to be compared. The two are compared by bringing one image of the object into juxtaposition and, in the case of screw threaded or like parts, into mesh with the inverted image of the master 5.

What is claimed is:

1. Optical projection apparatus, including a single screen, means for producing on said screen two identical silhouette images constituting the same profile of an object, means for causing said images to be projected on the screen and inverted with respect to one another in two directions at right angles to one another and means operating without change in the initial setting of said projecting and inverting means for moving said images in said two directions to obtain a better comparison thereof, the foregoing apparatus including a source of light, a lens system for forming by said light an image of an object to be examined, a prism having external mirrored surfaces and located in the beam from said lens system so as to divide said beam into two beams, an internally reflecting prism located in each of said two beams, one of said last-mentioned prisms reversing the image vertically and the other reversing the image horizontally, fixed mirrors directing the respective image-reversed beams upon said screen, and means for moving said object alternately in each of two directions at right angles in a plane normal to the axis of the beam from said lens system, whereby relative movement of the two images in corresponding directions on said screen is provided.

2. Optical projection apparatus including a single screen, means for producing on said screen two identical silhouette images constituting the same profile of an object, and means for causing said images to be projected on the screen and inverted with respect to one another in two directions at right angles to one another and means operating without change in the initial setting of said projecting and inverting means for moving said images in said two directions to obtain a better comparison thereof, the foregoing apparatus including a source of light, a lens system for forming by said light an image of an object to be examined, a prism having external mirrored surfaces and located in the beam from said lens system so as to divide said beam into two beams, fixed mirrors so positioned as to direct said respective two beams in directions that lie in a plane normal to the plane in which lie the beam from the lens system and the two beams produced by said prism, and means for moving said object alternatively in each of two directions at right angles in a plane normal to the axis of the beam from said lens system, whereby relative movement of the two images in corresponding directions on said screen is produced.

KENNETH MITCHELL.

REFERENCES CITED

The following references are of record in the file of this patent:

UNITED STATES PATENTS

| Number | Name | Date |
|---|---|---|
| 733,090 | Szczepanik | July 7, 1903 |
| 1,371,458 | Wilson | Mar. 15, 1921 |
| 1,421,042 | Twyman | June 27, 1922 |
| 1,424,556 | Cooke | Aug. 1, 1922 |
| 1,589,349 | Bausch, et al. | June 22, 1926 |
| 1,957,448 | Eitzen | May 8, 1934 |
| 2,019,234 | Nistri | Oct. 29, 1935 |
| 2,035,780 | Beardsley, et al. | Mar. 31, 1936 |
| 2,051,593 | Curtis | Aug. 18, 1936 |
| 2,066,435 | Unkles | Jan. 5, 1937 |
| 2,155,248 | Adams, et al. | Apr. 18, 1939 |
| 2,179,799 | Phillips | Nov. 14, 1939 |
| 2,365,613 | Wilber, et al. | Dec. 19, 1944 |